(12) United States Patent
Grudzien

(10) Patent No.: US 8,704,538 B2
(45) Date of Patent: Apr. 22, 2014

(54) CAPACITANCE SENSORS

(75) Inventor: Chrisy Grudzien, Haverhill, MA (US)

(73) Assignee: MKS Instruments, Inc., Andover, MA (US)

( * ) Notice: Subject to any disclaimer, the term of this patent is extended or adjusted under 35 U.S.C. 154(b) by 455 days.

(21) Appl. No.: 12/828,518

(22) Filed: Jul. 1, 2010

(65) Prior Publication Data
US 2012/0001648 A1    Jan. 5, 2012

(51) Int. Cl.
*G01R 27/26*    (2006.01)

(52) U.S. Cl.
USPC ............. 324/686; 73/715; 73/718; 73/724; 361/283.1; 361/283.3; 361/283.4

(58) Field of Classification Search
USPC .......................................... 324/686; 73/724
See application file for complete search history.

(56) References Cited

U.S. PATENT DOCUMENTS

| | | | | |
|---|---|---|---|---|
| 3,619,742 A | * | 11/1971 | Rud, Jr. .................... | 361/283.1 |
| 4,165,402 A | | 8/1979 | Dubs | |
| 4,236,137 A | * | 11/1980 | Kurtz et al. ................. | 338/4 |
| 4,414,851 A | * | 11/1983 | Maglic ....................... | 73/706 |
| 5,056,369 A | * | 10/1991 | Tamai et al. ................. | 73/718 |
| 5,209,118 A | * | 5/1993 | Jerman ....................... | 73/715 |
| 5,665,920 A | * | 9/1997 | Martin ....................... | 73/715 |
| 5,939,639 A | * | 8/1999 | Lethbridge .................. | 73/724 |
| 6,076,409 A | * | 6/2000 | Bang ........................... | 73/756 |
| 6,205,861 B1 | * | 3/2001 | Lee ............................. | 73/724 |
| 6,595,064 B2 | * | 7/2003 | Drewes et al. ............... | 73/718 |
| 6,615,665 B1 | * | 9/2003 | Flogel et al. ................ | 73/715 |
| 7,322,246 B2 | * | 1/2008 | Miller ......................... | 73/715 |
| 7,383,737 B1 | * | 6/2008 | Lin et al. .................... | 73/718 |
| 2002/0014124 A1 | * | 2/2002 | Drewes et al. ............... | 73/718 |
| 2004/0237658 A1 | * | 12/2004 | Ohms et al. ................. | 73/718 |
| 2005/0252300 A1 | * | 11/2005 | Miller ......................... | 73/715 |
| 2006/0053893 A1 | * | 3/2006 | Banholzer et al. ........... | 73/715 |
| 2007/0113661 A1 | * | 5/2007 | Benzel et al. ............... | 73/715 |
| 2008/0236291 A1 | * | 10/2008 | Yane et al. .................. | 73/715 |
| 2009/0266172 A1 | * | 10/2009 | Casey et al. ................. | 73/724 |

FOREIGN PATENT DOCUMENTS

FR    2607927    6/1988

OTHER PUBLICATIONS

International Search Report and the Written Opinion from corresponding PCT Application No. PCT/US11/41211 dated Oct. 7, 2011.

* cited by examiner

*Primary Examiner* — Benjamin M Baldridge
(74) *Attorney, Agent, or Firm* — McDermott Will & Emery LLP

(57) ABSTRACT

A sensor assembly includes a housing assembly, an electrode arrangement and a diaphragm having a fixed portion secured to the housing assembly and an active portion movable relative to the electrode arrangement in response to a differential pressure applied to opposite sides of the diaphragm. The fixed portion of the diaphragm is secured at one or more locations relative to at least a portion of the housing assembly; and at least one groove is formed in the fixed portion of the diaphragm between the locations at which the diaphragm is fixed relative to the housing assembly and the active portion so as to relieve any stress on the active portion of the diaphragm. A method of making the sensor assembly is also disclosed.

22 Claims, 1 Drawing Sheet

CAPACITANCE SENSORS

FIELD

Figure 1:
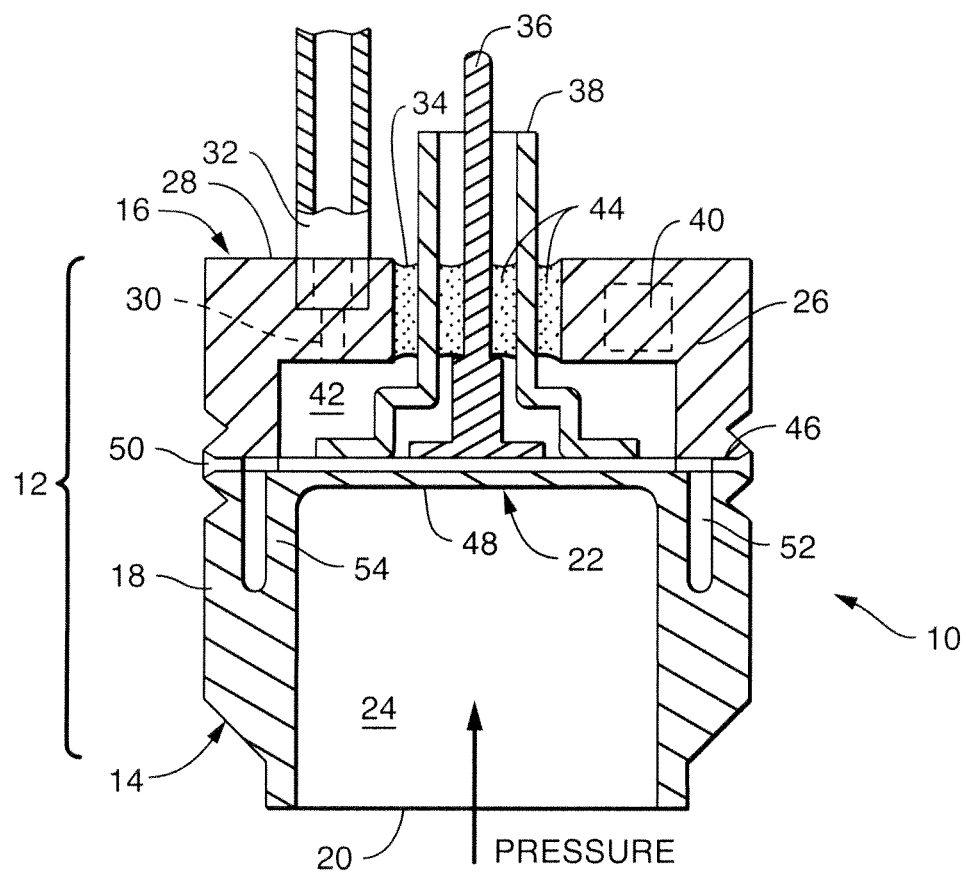

The present invention relates to capacitance sensors, and more particularly to a low pressure capacitance manometer including a diaphragm constructed so as to secure the diaphragm within the manometer housing so as to eliminate buckling during welding, and isolate the diaphragm from welding induced strains.

BACKGROUND

Capacitance sensors usually include a housing which includes two chambers, the first for receiving the gas or vapor whose pressure is to be measured and the second for receiving a gas at a reference pressure. The reference pressure is typically either determined from a reference source or ambient gas reflecting ambient conditions. The two chambers are separated by a flexible diaphragm positioned therebetween. The diaphragm is fixed around its periphery so that it seals one chamber from the other, and has an active portion that flexes as a function of the difference between the measured pressure and the reference pressure. In a capacitance manometer, the diaphragm is spaced from two electrodes, one typically a ring electrode and the other a center electrode, both axially aligned with the center axis of the active portion of the diaphragm. The electrodes are positioned in one of the chambers, usually the chamber containing the reference gas. When a differential pressure is applied to the diaphragm, the diaphragm flexes relative to the two electrodes. By electrically connecting the diaphragm so that it also functions as an electrode, the differential pressure can be measured as a function of the difference in capacitance between the diaphragm and the center electrode and the capacitance between the diaphragm and the ring electrode. With the reference pressure known, the measured pressure can easily be determined from the capacitance measurements.

The pressure measurement range of the capacitance manometer is partly determined by the spacing between the diaphragm and the ring and center electrodes. In the zero position, the surfaces of the diaphragm must be flat and as parallel as possible to the ring and center electrodes. Thus, the lower the values in differential pressure that are to be measured, the closer the diaphragm needs to be secured in the sensor housing relative to the ring and center electrodes to provide a maximum signal dynamic range for the pressure range in question. This results in the requirement of parallelism to be even greater. As a result great care is taken to lap the surfaces of the diaphragm prior to securing the diaphragm within the housing so that they are as planar as possible. Further, care must be taken to secure the diaphragm within the housing so as to ensure the proper position and parallelism of the diaphragm relative to the ring and center electrodes. The diaphragm is usually formed as a part of the pressure measurement subassembly of the sensor and is subsequently welded to the reference subassembly containing the ring and center electrodes. Welding the diaphragm in place, however, can cause the diaphragm to buckle thereby shifting the gap due to stresses in the weld. Thus, buckling introduces some non-parallelism since the diaphragm will no longer be completely planar. This is particularly critical for sensors that are used to measure relatively low differential pressures because of the very narrow gap required between the diaphragm and the ring and center electrodes.

Various techniques, such as electron beam welding and laser welding are known to provide welds having reduced stress, but such techniques are relatively expensive to implement. Using a relatively less expensive technique, such as Gas Tungsten Arc Welding (GTAW) or Plasma welding, results in greater stress being placed on the diaphragm. Similarly, reducing the thickness of the diaphragm to accommodate lower pressures is difficult because of the difficulty of securing the diaphragm relative to the housing without the diaphragm distorting. Accordingly, it is desirable to construct the sensor so that the diaphragm can be secured within the sensor housing in which the flatness of the diaphragm and the gap spacing between the diaphragm and each of the ring and center electrodes are satisfactorily maintained after the sensor is assembled.

SUMMARY

In accordance with one aspect, a sensor assembly comprises a housing assembly; an electrode arrangement and a diaphragm having a fixed portion secured to the housing assembly and an active portion movable relative to the electrode arrangement in response to a differential pressure applied to opposite sides of the diaphragm. The fixed portion of the diaphragm is secured at one or more locations relative to at least a portion of the housing assembly; and at least one groove is formed in the fixed portion of the diaphragm between the locations at which the diaphragm is fixed relative to the housing assembly and the active portion so as to relieve any stress on the active portion of the diaphragm.

In accordance with another aspect, a capacitance sensor assembly is arranged to measure a pressure relative to a reference pressure. The capacitance sensor assembly comprises: a housing assembly; an electrode arrangement fixedly secured relative to the housing assembly; and a flexible diaphragm having (a) an active portion and (b) a fixed portion fixed at one or more locations relative to the housing assembly. The housing assembly supports the diaphragm and electrode arrangement in a spaced relationship with one another such that the active portion of the diaphragm flexes relative to the electrode arrangement in response to a differential pressure applied to opposite sides of the active portion of the diaphragm. The diaphragm includes at least one groove between the locations at which the flexible diaphragm is fixed relative to the housing assembly and the active portion so as to relieve any stress on the active portion of the diaphragm.

In accordance with another aspect, a method is provided of constructing a sensor assembly of the type including a housing assembly, an electrode arrangement and a diaphragm having a fixed portion secured to the housing assembly and an active portion movable relative to the electrode arrangement in response to a differential pressure applied to opposite sides of the diaphragm. The method comprises securing the fixed portion of the diaphragm at one or more locations relative to at least a portion of the housing assembly; and forming at least one groove in the fixed portion of the diaphragm between the locations at which the diaphragm is fixed relative to the housing assembly and the active portion so as to relieve any stress on the active portion of the diaphragm.

GENERAL DESCRIPTION OF THE DRAWINGS

Figure 2:
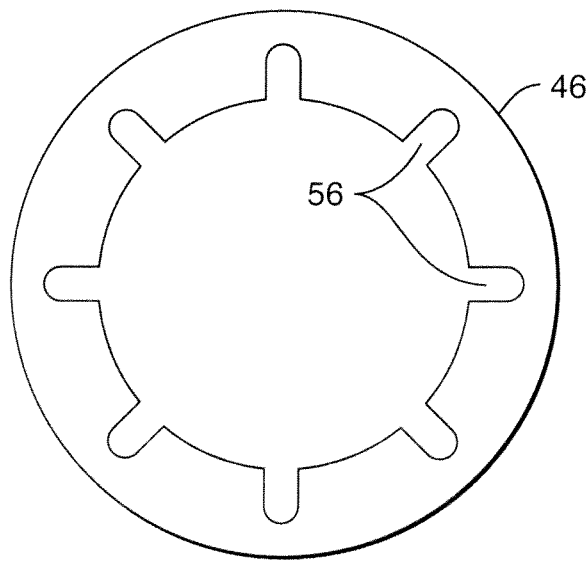

Reference is made to the attached drawings, wherein elements having the same reference character designations represent like elements throughout, and wherein:

FIG. 1 is a cross-sectional view of one embodiment of a capacitance sensor assembly incorporating the improved structure; and FIG. 2 is a top view of one embodiment of a spacer utilized in the FIG. 1 embodiment.

DETAILED DESCRIPTION OF THE DRAWINGS

Referring to FIG. 1, an embodiment of the capacitance sensor assembly 10 is used to measure a pressure relative to a reference pressure. The capacitance sensor assembly 10 comprises a housing assembly 12. Housing assembly 12 includes at least two subassemblies, measurement subassembly 14 and reference subassembly 16. Subassembly 14 includes a cylindrical section 18 having an opening 20 at one end for receiving the gas whose pressure is to be measured, and the diaphragm 22 at the other end. The space defined by the section 18, opening 20 and diaphragm 22 defines a measurement chamber 24 for containing the gas whose pressure is to be measured. The second, reference subassembly 16 includes a cylindrical section 26 having an end plate 28 having a first opening 30 for receiving the inlet tube 32, a second opening 34 for receiving the electrode arrangement that includes a center electrode 36 and ring electrode 38, and a getter (shown in dotted lines) 40. The cylindrical section 26 and end plate 28, when secured to the first housing subassembly forms a reference gas chamber 42 closed at the opposite end by the diaphragm 22. The inlet tube 32 is sealed within the end plate 28 so that gas can be introduced into or removed from the reference gas chamber 38 through the tube. The reference gas can be at a prefixed reference pressure, in which case the tube can be sealed closed once the reference pressure is established. Alternatively, the reference gas can be at ambient pressure in which case the tube is left open. The electrodes 36 and 38 can be sealed in place with an appropriate electrically insulating sealing material 44 (such as glass, ceramic, . . . ) so that they are properly positioned relative to the active portion of the diaphragm and each other. A spacer element 46 is typically in the form of a ring disposed between the diaphragm and electrodes so that the electrodes 36 and 38 are each spaced a prefixed distance from one side of the diaphragm 22.

The diaphragm 22 is secured in place so that the measurement gas chamber 24 and reference gas chamber 42 are sealed from one another. Further, the outer portion of the diaphragm 22 is fixed relative to the housing assembly 14, while the center portion 48 of diaphragm 22 opposing the electrodes is an active portion that flexes by an amount as a function of the differential pressure applied to opposite sides of the diaphragm 22.

In operation, the differential pressure applied to the diaphragm can be measured as a function of the difference in capacitance between the active portion 48 of the diaphragm 22 and center electrode 36 and the capacitance between the diaphragm 22 and the ring electrode 38. For this reason the active region 48 of the diaphragm, center electrode 36 and ring electrode 38 should be secured so that they are coaxially aligned with one another, and the diaphragm 22 needs to be as flat as possible so as to provide correct capacitive measurements relative to the two electrodes.

During assembly, the diaphragm 22 is secured to the housing assembly 12 so that the diaphragm is secured in place around its peripheral edges 50, by any suitable means, such as welding. The same weld can be used to secure the spacer element 46 and the two subassemblies 14 and 16. Diaphragm 22 should be attached in such a way so as to insure that the measurement gas chamber 24 and the reference gas chamber 42 are isolated from one another so that the chambers can be maintained at pressures independent form one another. During the welding process, mechanical stresses are usually introduced in the diaphragm causing active portion 48 of diaphragm 22 to have some distortion in its flatness. This, of course, can introduce errors in capacitance measurements, and thus pressure measurements.

Accordingly, it is desirable to construct the sensor assembly 10 so that the diaphragm 22 retains its flatness after it is secured relative to the housing assembly 12. Specifically, the sensor assembly is constructed so as to include structure for relieving the mechanical stress in the active portion 48 of the diaphragm 22 after the diaphragm is welded in place. In the embodiment shown, mechanical stress is relieved by forming a groove 52 in the diaphragm 22 between the locations where the diaphragm is fixed relative to the housing assembly 10, and the active portion 48 of the diaphragm 22. In the embodiment described, the entire peripheral portion of the diaphragm is fixed so the groove 52 is annular around the entire diaphragm. The depth of the groove should be sufficient to ensure that any stresses will be accommodated by the groove without affecting the active portion of the diaphragm. It has been empirically determined that a depth to width aspect ratio of the groove of at least (approximately) 5:1 provides the best results, although this can vary. The groove 52 is in fluid communication with one of the chambers, with the illustrated embodiment showing the groove in fluid communication with the reference gas chamber 42. This results in a differential pressure between the gas in the groove 52 and the gas in the measurement chamber 24, when there is a differential pressure present on opposite sides of the diaphragm 22. Accordingly, the wall 54 between the groove 52 and the measurement gas chamber 42 should be thick enough to remain stiff when the differential pressure is at the maximum value of the range of differential pressures for which the sensor is designed.

The spacing element 46 shown as a ring is designed to ensure the fluid communication between the groove 52 and the reference gas chamber 42. This can be accomplished by either making the inner diameter of the ring larger than the diameter of the groove, or forming apertures or grooves in the ring that are aligned with one or more portions of the annular groove as illustrated in FIG. 2, where the spacer is shown with grooves 56 formed on the inner portion of the ring.

It should be appreciated that by forming the capacitance sensor assembly so as to relieve mechanical stresses on the diaphragm allows the diaphragm to be secured relative to housing in accordance with any number of techniques regardless of how much mechanical stress is initially created. Accordingly, lower cost techniques such as GTAW or Plasma welding can be employed so as to lower the cost of manufacturing of sensor.

The new and improved capacitance sensor assembly and method of the present disclosure as disclosed herein, and all elements thereof, are contained within the scope of at least one of the following claims. No elements of the presently disclosed system and method are meant to be disclaimed, nor are they intended to necessarily restrict the interpretation of the claims. In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A capacitance sensor assembly arranged to measure a pressure relative to a reference pressure, the capacitance sensor assembly comprising:
   a housing assembly including an opening having an inner radial wall extending along a radius from a longitudinal axis and defining a space within the housing;
   an electrode arrangement disposed within the housing and fixedly secured relative to the housing assembly; and
   a flexible diaphragm disposed within the housing and defining a first surface and an opposed second surface, the diaphragm further having (a) an active portion that is operative to flex in response to a pressure differential between the first surface and the second surface, and (b) a fixed portion having an outer radial perimeter that is fixed at one or more connections to the inner radial wall of the housing assembly;
   wherein the housing assembly supports the diaphragm and electrode arrangement in a spaced apart relationship with respect to one another such that the active portion of the diaphragm flexes relative to the electrode arrangement in response to a differential pressure applied to the opposed first and second surfaces of the diaphragm; and
   wherein the connections are configured to present a groove between the diaphragm and the inner radial wall of the housing assembly, wherein the diaphragm is connected to the inner radial wall of the housing assembly at an inner radial portion of the groove, wherein the groove is operative to relieve any stress on the active portion of the diaphragm under a condition of zero differential pressure.

2. A capacitance sensor assembly according to claim 1, wherein the groove is in fluid communication with one side of the active portion of the diaphragm.

3. A capacitance sensor assembly according to claim 2, wherein the housing assembly is constructed so as to include a reference chamber on one side of the active portion of the diaphragm for receiving a reference gas, and a measurement chamber on the other side of the active portion for receiving the gas whose pressure is to be measured relative to the reference gas.

4. A capacitance sensor assembly according to claim 3, wherein the reference gas is at ambient pressure, and further including an inlet for introducing a gas at ambient pressure into the reference chamber.

5. A capacitance sensor assembly according to claim 3, wherein the reference gas is at a predetermined pressure, and further including an inlet for introducing a gas at a reference pressure into the reference chamber.

6. A capacitance sensor assembly according to claim 3, wherein the reference chamber and measurement chamber are sealed from one another.

7. A capacitance sensor assembly according to claim 6, wherein the electrode arrangement is secured within the reference chamber.

8. A capacitance sensor assembly according to claim 7, wherein the electrode arrangement includes a ring electrode and a center electrode, each spaced a predetermined distance relative to the active portion of the diaphragm.

9. A capacitance sensor assembly according to claim 3, wherein the groove is in fluid communication with the reference chamber.

10. A capacitance sensor assembly according to claim 1, further including a spacer ring secured relative to the diaphragm and electrode arrangement so as to maintain the spacing between the diaphragm and the electrode arrangement at a predetermined distance so that the active portion flexes relative to the electrode arrangement through a predetermined range of differential pressures applied to opposite sides of the active portion of the diaphragm.

11. A capacitance sensor assembly according to claim 10, wherein the spacer is formed so as to allow at least a portion of the groove of the diaphragm to be in fluid communication with one side of the active portion of the diaphragm.

12. A capacitance sensor assembly according to claim 11, wherein the groove of the diaphragm and the one side of the active portion of the diaphragm receives a reference gas.

13. A capacitance sensor assembly according to claim 12, wherein the reference gas is at ambient pressure.

14. A capacitance sensor assembly according to claim 12, wherein the reference gas is at a reference pressure.

15. A capacitance sensor assembly according to claim 11, wherein the spacer includes a matching groove that is aligned with the groove of the diaphragm, along the longitudinal axis of the housing assembly, and configured so as to allow fluid communication between the groove and a reference chamber defined on one side of the diaphragm.

16. A capacitance sensor assembly according to claim 1, wherein the diaphragm is secured to the housing assembly entirely around the fixed portion of the diaphragm, and the groove in the diaphragm is an annular groove.

17. A capacitance sensor assembly according to claim 16, further including a spacer ring secured relative to the diaphragm and electrode arrangement so as to maintain the spacing between the diaphragm and the electrode assembly at a prefixed distance so that the active portion flexes relative to the electrode arrangement through a predetermined range of differential pressures applied to opposite sides of the active portion of the diaphragm, the spacer including a plurality of grooves, each aligned with the annular groove of the diaphragm so as to maintain the groove of the diaphragm in fluid communication with one side of the active portion of the diaphragm.

18. A method of constructing a sensor assembly of the type including a housing assembly, an electrode arrangement and a diaphragm having a fixed portion secured to the housing assembly and an active portion movable relative to the electrode arrangement in response to a differential pressure applied to opposite sides of the diaphragm, the method comprising:
   securing the fixed portion of the diaphragm at one or more locations relative to at least a portion of the housing assembly; and
   forming a groove between the diaphragm and the inner radial wall of the housing assembly, wherein the groove is operative to relieve any stress on the active portion of the diaphragm under a condition of zero differential pressure, wherein the diaphragm is connected to the inner radial wall of the housing assembly at an inner radial portion of the groove.

19. The method according to claim 18, wherein securing the fixed portion of the diaphragm includes welding the fixed portion of the diaphragm to a portion of the housing assembly.

20. The method according to claim 18, wherein forming at least one groove includes electro-discharged machining the groove in the fixed portion of the diaphragm after the diaphragm is secured in place.

21. The method according to claim 18, further including securing a spacer ring between the electrode arrangement and the diaphragm so as to fix the gap spacing between the active portion of the diaphragm and the electrode arrangement.

22. The method according to claim 21, further including forming at least one groove in the spacer so that the groove in the spacer is aligned with the groove in the diaphragm so that the groove in the diaphragm is in fluid communication with one side of the diaphragm.

* * * * *